US006567468B1

(12) United States Patent
Kato et al.

(10) Patent No.: US 6,567,468 B1
(45) Date of Patent: May 20, 2003

(54) MOTION DETECTION CIRCUIT AND A NOISE SUPPRESSING CIRCUIT INCLUDING THE SAME

(75) Inventors: Noriyoshi Kato, Hamamatsu (JP); Yukio Fujita, Kakegawa (JP); Misa Kasahara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/394,684

(22) Filed: Sep. 13, 1999

(30) Foreign Application Priority Data

Sep. 29, 1998 (JP) .......................................... 10-276254

(51) Int. Cl.[7] .......................... H04N 7/12; H04N 11/02; H04N 11/04
(52) U.S. Cl. ............................. 375/240.12; 375/240.16; 375/240.14
(58) Field of Search ....................... 375/240.14, 240.01, 375/240.16, 240.29, 240.12; 382/264, 263, 199

(56) References Cited

U.S. PATENT DOCUMENTS

| 5,539,469 A | * | 7/1996 | Jung ........................... 348/413 |
| 5,600,737 A | | 2/1997 | Kato et al. |
| 5,631,706 A | * | 5/1997 | Tsunashima ................ 348/452 |
| 5,668,600 A | * | 9/1997 | Lee ............................. 348/416 |
| 5,936,676 A | * | 8/1999 | Ledinh et al. .............. 348/452 |
| 6,118,488 A | * | 9/2000 | Huang ........................ 348/452 |
| 6,297,846 B1 | * | 10/2001 | Edanami ..................... 348/239 |

FOREIGN PATENT DOCUMENTS

| EP | 0310032 | 4/1989 |
| EP | 0502615 | 9/1992 |
| JP | 7-131676 | 5/1995 |
| JP | 9-81754 | 3/1997 |

OTHER PUBLICATIONS

Nogaki S. et al.: " A Study on HDTV signal coding with motion adaptive noise reduction".

\* cited by examiner

*Primary Examiner*—Vu Le
*Assistant Examiner*—Charles Parsons
(74) *Attorney, Agent, or Firm*—Louis Woo

(57) ABSTRACT

In a motion detection circuit, a difference signal between the video and one-frame delayed video signals is generated. An Edge signal is generated from the video and delayed video signals. Motion in a target pixel is judged from the interframe difference signal according to the edge signal. A motion judging circuit further includes an LPF and a selector for supplying an output of the LPF or the difference signal. The motion judging circuit may further includes: a peripheral pixel comparing circuit (may be bypassed) for detecting motion at the pixel by checking polarities of the difference signal at an area around the target pixel; a majority detection circuit (may be bypassed) for detecting a majority of the results of the polarity deviation detection circuit to judge the motion with deviation to a side of stopping; and a polarity deviation detecting circuit for judging the motion as moving in the presence of agreement of the polarities of all pixels at any of peripheral areas around the target pixel. The size of the peripheral areas are controlled. The polarity deviation circuit may compensate the result of the majority detection circuit. Width of the edge signal is controlled. A noise suppression apparatus including a motion detection circuit mentioned above is also disclosed.

17 Claims, 7 Drawing Sheets

TARGET PIXEL
TP

PREDETERMINED
AREA

TARGET PIXEL
TP

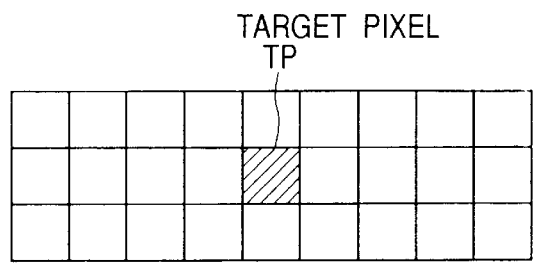
FIG. 5A
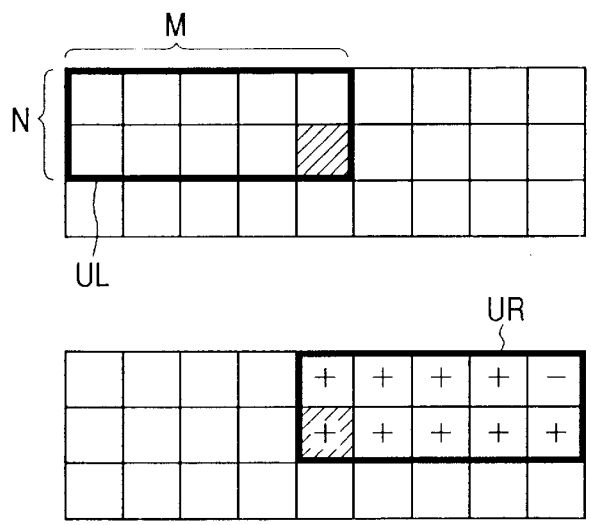
FIG. 5B
FIG. 5C
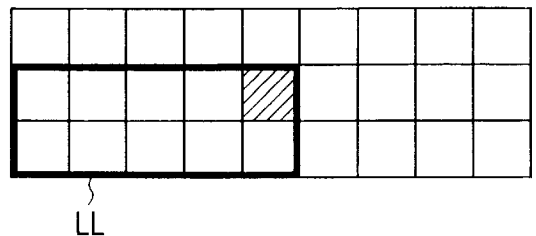
FIG. 5D
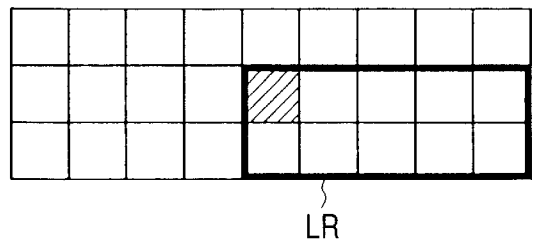
FIG. 5E

MOTION DETECTION CIRCUIT AND A NOISE SUPPRESSING CIRCUIT INCLUDING THE SAME

BACKGROUND OF THE INVENTION

1. Field of the Invention

This invention relates to a motion detection circuit for detecting motion in a video signal and a noise suppression circuit including the motion detection circuit.

2. Description of the Prior Art

A motion detection circuit for detecting motion in a video signal from a difference signal between the video signal and the one-frame delayed video signal is known and a noise suppression circuit is also known. The noise suppression circuit includes the motion detection circuit, a circulation signal generation circuit for generating a circulation signal in accordance with the difference signal and the motion detection signal, and a subtractor for subtracting the circulation signal from the video signal to output a noise suppressed video signal. Such a prior art motion detection circuit and a prior art noise suppression circuit are disclosed in Japanese patent application provisional publication No. 9-81754.

FIG. 8 is a block diagram of such a prior art noise suppression circuit including a prior art motion detection circuit.

The prior art motion detection circuit includes a frame memory 610 for generating a delayed video signal from the noise suppressed video signal, a subtractor 602 for generating a difference signal (interframe difference signal) between the video signal Vi and the delayed video signal, a motion detection circuit 603 for detecting a motion from the video signal Vi and the delayed video signal to output a motion detection signal.

The noise suppression circuit further includes a subtractor 607 for generating the difference signal between the video signal Vi and the delayed video signal, a circulation amount determining circuit 608 for generating a circulation signal from the difference signal in accordance with the motion detection signal, and a subtractor 609 for obtaining the difference between the video signal Vi and the circulation signal to output the noise suppressed video signal.

SUMMARY OF THE INVENTION

The aim of the present invention is to provide a superior motion detection circuit and a superior noise suppression circuit.

According to the present invention, there is provided a first motion detection circuit including: a delay for generating a delayed video signal from a video signal, the delayed video signal being delayed by one frame from the video signal; an interframe difference signal generation circuit for generating an interframe difference signal between the video signal and the delayed video signal; an edge detection signal generation circuit for detecting an edge from the video signal and the delayed video signal and generating an edge detection signal; and a motion judging circuit for judging a motion in the video signal at a target pixel from the interframe difference signal in accordance with the edge detection signal to output a motion detection signal, wherein the motion judging circuit includes: a peripheral pixel comparing circuit for detecting polarities of the interframe difference signal at each pixel at a predetermined area around the target pixel, detecting a difference in the number between the positive and negative polarities of the interframe difference signal at each pixel at the predetermined area and an absolute value of the difference, obtaining a J-valued first result from the absolute value; and a majority detection circuit including a memory for detecting a majority of Q of the first results of the peripheral pixel comparing circuit at Q pixels around the target pixels and judging the motion in the interframe difference signal at the target pixel in accordance with the detected majority with deviation to a side of stopping to output a second result as the motion detection signal, J being a natural number more than one, Q being a natural number more than one.

The first motion detection circuit may further include a low-pass filter for low-pass-filtering the interframe difference signal; and a selector for supplying either of an output of the low-pass filter or the interframe difference signal to the motion judging circuit as the interframe difference signal in accordance with a selection signal.

In a second motion detection circuit, the motion judging circuit mentioned in the first motion detection circuit may further include a polarity deviation detecting circuit for detecting polarities of the interframe difference signal at each pixel of the video signal, detecting agreement of the polarities of all pixels at any of an upper left area of the target pixel, an upper right area of the target pixel, a lower left area of the target pixel, and a lower right area of the target pixel, and judging motion in the interframe difference signal at the target pixel to be moving in the presence of the agreement, each of the upper left area, the upper right area, the lower left area, and the lower right area including M×N pixels of the video signal, M and N being natural numbers, wherein the polarity deviation detection circuit changes the second result from the intermediate movement to the stopping in accordance with the agreement to output the motion detection signal when the second result is indicative of the intermediate motion and outputs the motion detection signal with the second result unchanged when the second result is indicative of the moving and stopping.

In the second motion detection circuit, the upper left area, the upper right area, the lower left area, and the lower right area include the target pixel or are outside and adjacent to the target pixel.

In a third motion detection circuit, the edge detection signal generation circuit mentioned in the first motion detection circuit may include a first edge detection circuit for detecting an edge from the video signal, a second edge detection circuit for detecting an edge from the delayed video signal, a third edge detection circuit for detecting an edge from the video signal and the delayed video signal, and a switch responsive to a selection signal for outputting either of an output of the first, second, or third edge detection circuit as the edge detection signal.

In the third motion detection circuit, the edge detection signal generation circuit may be further responsive to a width control signal indicative of values of m and n and the edge detection signal generation circuit may detect the edge detection signal with a horizontal width of (2m+1) pixels and with a vertical width of (2n+1) pixels, the n and m are positive integers.

In the second motion detection circuit, values of the M and N may be controlled in accordance with the edge detection signal.

According to the present invention there is also provided a noise suppression apparatus including: a motion detection circuit including: a delay for generating a delayed video signal from a video signal, the delayed video signal being delayed by one frame from the video signal; an interframe difference signal generation circuit for generating an interframe difference signal between the video signal and the delayed video signal; a low-pass filter for low-pass-filtering the interframe difference signal; a switch for outputting either of an output of the low-pass filter or the interframe difference signal in accordance with a selection signal; an edge detection signal generation circuit for detecting an edge from the video signal and the delayed video signal and generating an edge detection signal; and a motion judging circuit for judging motion in a target pixel of the video signal from an output of the switch in accordance with the edge detection signal; a circulation signal generation circuit for generating a circulation signal in accordance with the interframe difference signal and the judged motion; and a difference signal generation circuit for generating a difference signal between the circulation signal and the video signal to output a noise suppressed video signal, wherein the motion judging circuit includes: a peripheral pixel comparing circuit for detecting polarities of the interframe difference signal at each pixel at a predetermined area around the target pixel, detecting a difference in the number between the positive and negative polarities of the interframe difference signal at each pixel at the predetermined area and an absolute value of the difference, obtaining a J-valued first result the absolute value, the polarity deviation detection circuit changing the first result to stopping in accordance with the agreement when the difference is judged to be an intermediate value among J values to output a second result; and a majority detection circuit including a memory for detecting a majority of Q the second results of the polarity deviation detection circuit at Q pixels around the target pixels and judging the motion in the interframe difference signal at the target pixel in accordance with the detected majority with deviation to a side of stopping to output the motion detection signal, J being a natural number more than one, Q being a natural number more than one.

In the noise suppression circuit, the circulation signal generation circuit may include: a coefficient generation circuit for generating a coefficient k, k≦0<1 in accordance with a judging result of the motion judging circuit; and a multiplier for multiplying the video signal by the coefficient k to output a circulation signal In the noise suppression apparatus, the coefficient k when the motion judging circuit judges the motion to be stopping is greater than the coefficient k when the motion judging circuit judges the motion to be moving.

The motion detection circuit in the noise suppression apparatus may be replaced with each of the motion detection circuit mentioned above.

BRIEF DESCRIPTION OF THE DRAWINGS

The object and features of the present invention will become more readily apparent from the following detailed description taken in connection with the accompanying drawings in which:

FIGS. 5A to 5E and FIGS. 6A to 6E are illustrations of this embodiment showing operations of the polarity deviation detection circuit shown in FIG. 2;

The same or corresponding elements or parts are designated with like references throughout the drawings.

DETAILED DESCRIPTION OF THE INVENTION

Hereinbelow will be described an embodiment of this invention.

Figure 1:
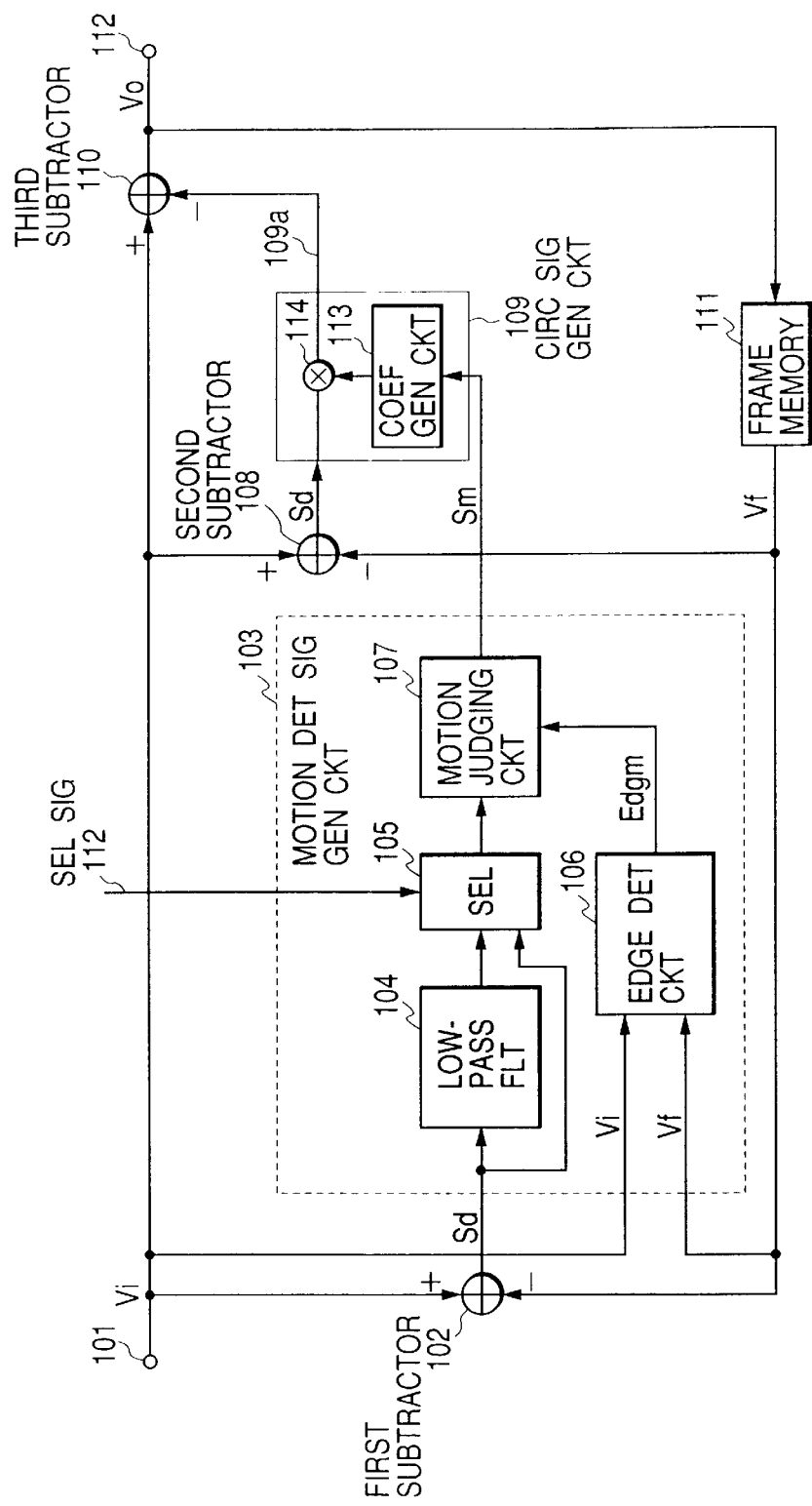
FIG. 1 is a block diagram of an embodiment of the present invention showing a structure of a motion detection circuit and a noise suppression circuit including the motion detection circuit.

FIG. 1 is a block diagram of the embodiment of the present invention showing a structure of a motion detection circuit and a noise suppression circuit including the motion detection circuit.

A motion detection circuit of the embodiment includes a frame memory 111 (delay) for generating a delayed video signal (one-frame-delayed video signal) Vf from a video signal Vi, a subtractor 102 for generating a difference signal between the video signal Vi and the delayed video signal Vf as an interframe difference signal Sd, and a motion detection signal generation circuit 103 for detecting a motion in the interframe difference signal Sd at a target pixel to output a motion detection signal Sm.

In addition to the structure mentioned above, the noise suppression circuit includes a subtractor 108 for generating the interframe difference signal Sd from the video signal Vi and the delayed video signal Vf, a circulation signal generation circuit 109 for generating a circulation signal 109a from the interframe difference signal in accordance with the motion detection signal Sm, and a subtractor 110 for obtaining a difference between the video signal Vi and the circulation signal 109a to output a noise suppressed video signal Vo.

The circulation signal generation circuit 109 includes: a coefficient generation circuit 113 for generating a coefficient k, k≦0<1, in accordance with the motion detection signal Sm from the motion Judging circuit 107 and a multiplier 114 for multiplying the video signal by the coefficient k.

Either of the subtractors 102 and 108 can be omitted. An input of the frame memory 111 is supplied with the video signal Vi instead the noise suppressed video signal Vo if only motion detection circuit is used.

The video signal Vi inputted at a video signal input terminal 101 is supplied to the subtractor 102, a subtractor 108, and to the subtractor 110. The subtractor 110 subtracts the circulation signal 109a from the video signal Vi to generate the noise suppressed video signal Vo which is an output of the noise suppressing circuit. The noise suppressed video signal Vo is supplied to the frame memory 111 to delay the video signal Vi by one frame to output the delayed video signal Vf. The subtractor 102 subtracts the delayed video signal Vf from the video signal Vi to generate the interframe difference signal Sd which is supplied to the low-pass filter 104 and to the selector 105 of the motion detection signal generation circuit 103. The interframe difference signal Sd is low-pass-filtered by the low-pass filter 104. The selector 105 selects either the interframe difference signal Sd or the output of the low-pass filter 104 in accordance with the selection signal 112. That is, switching the selector 105 is effected in accordance with the frequency characteristic of the interframe difference signal Sd supplied to the motion detection signal generation circuit 103 to supply the interframe difference signal having an optimum frequency characteristic for a motion Judging circuit 107 mentioned later.

The motion detection signal generation circuit 103 further includes an edge detection circuit 106 for detecting an edge from the video signal Vi and the delayed video signal Vf and generating an edge detection signal Edgm and the motion judging circuit 107 for Judging a motion in the interframe difference signal at a target pixel from an output of the selector 105 in accordance with the edge detection signal Edgm to output the motion detection signal Sm.

The edge detection circuit 106 detects an edge portion of the object from the video signal Vi and the delayed video signal Vf to generate the edge detection signal Edgm for the polarity deviation detection circuit 203. The motion judging circuit 107 judges the degree of motion at a target pixel TP and the result is supplied to the circulation signal generation circuit 109.

On the other hand, the subtractor 108 generates the interframe difference signal Sd which is supplied to a coefficient generation circuit 113 of the circulation signal generation circuit 109 which determines the coefficient K as follows:

When motion in the interframe difference signal Sd at the target pixel is Judged to be moving, K=k3.

When motion in the interframe difference signal Sd at the target pixel is Judged to be intermediate motion, K=k2.

When motion in the interframe difference signal Sd at the target pixel is judged to be stopping, K=k1. $0 \leq k3 < k2 < k1 < 1$.

The interframe difference signal Sd is multiplied by the coefficient K with the multiplier 114 to generate the circulation signal 109a which is supplied to the subtractor 110. The subtractor 110 subtracts the circulation signal 109a from the video signal Vi to generate the noise suppressed video signal Vo as mentioned above.

Figure 2:
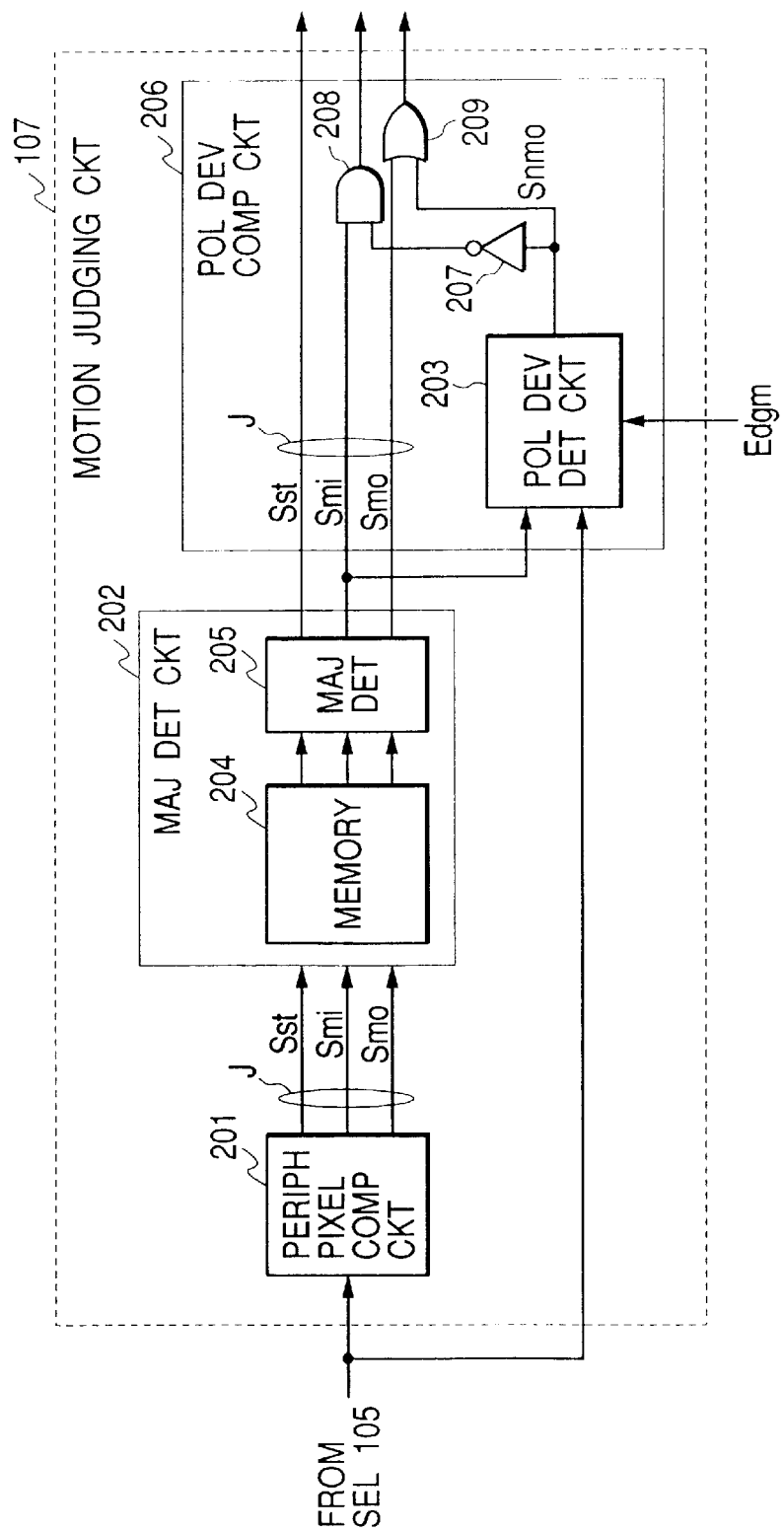
FIG. 2 is a block diagram of this embodiment showing a structure of the motion judging circuit shown in FIG. 1.

FIG. 2 is a block diagram of this embodiment showing the structure of the motion judging circuit 107 shown in FIG. 1.

The motion judging circuit 107 includes a peripheral pixel comparing circuit 201, a majority detection circuit 202, and a polarity deviation compensation circuit 206.

Figure 3:
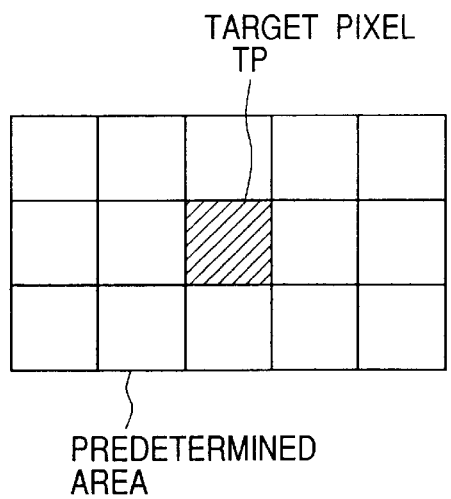
FIG. 3 is an illustration of the embodiment for illustrating an operation of the peripheral pixel comparing circuit shown in FIG. 2.

FIG. 3 is an illustration of the embodiment for illustrating an operation of the peripheral pixel comparing circuit 201.

The peripheral pixel comparing circuit 201 detects polarities of the interframe difference signal Sd at each pixel at a predetermined area around a target pixel as shown in FIG. 3, for example 5×3 including the target pixel TP, detects the number of positive polarities PP of the interframe difference signal Sd at the predetermined area and the number of negative polarities NP of the interframe difference signal at the predetermined area, obtains a difference (PP−NP) in the number between the positive and negative polarities and an absolute value of the difference |PP−NP|, compares the absolute value |PP−NP| with first and second different references (J-1 different references), i.e., TH_S and TH_M, to output a first judging result (J-valued result).

When TH_M ≦ |PP−NP|, the video signal at the target pixel is judged to be moving (Smo).

When TH_S ≦ |PP−NP| < TH_M, the video signal at the target pixel is judged to be intermediate moving (Smi).

When $0 \leq$ |PP−NP| < TH_S, the video signal at the target pixel is judged to be stopping (Sst).

The J-valued (three-valued) first judging result is supplied to the majority detection circuit 202 which effects motion judgment again in response to the judging result of the intermediate motion Smi. J is a natural number more than one.

The first judging result from the peripheral pixel comparing circuit 201 is supplied to the majority detecting circuit 202 to provide further motion judgement to provide further accurate motion judgement.

Figure 4:
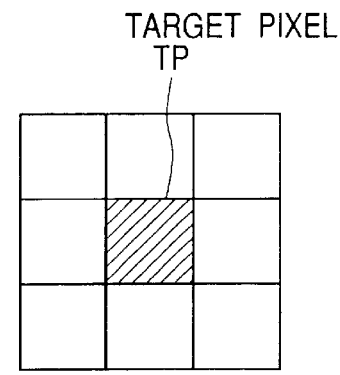
FIG. 4 is an illustration of this embodiment showing an operation of the majority detection circuit shown in FIG. 2.
Figure 6A:
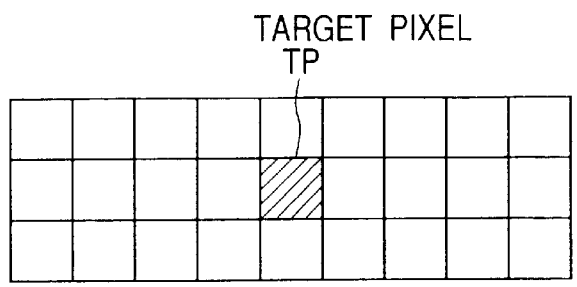
Figure 6B:
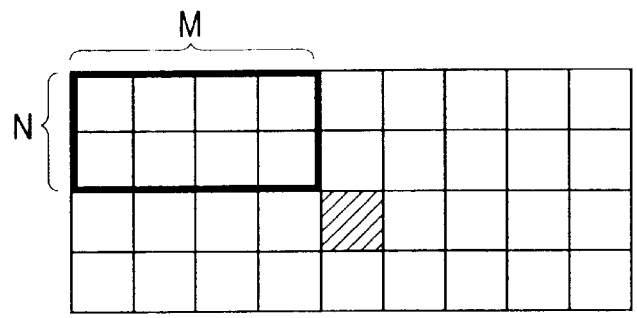
Figure 6C:
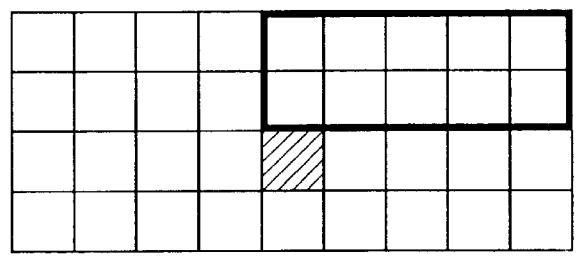
Figure 6D:
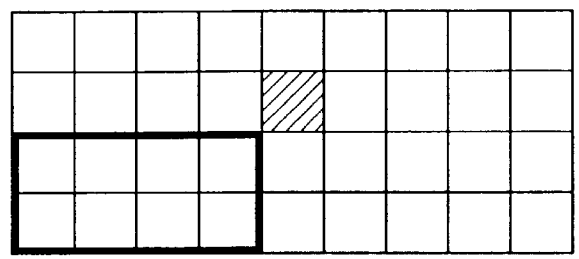
Figure 6E:
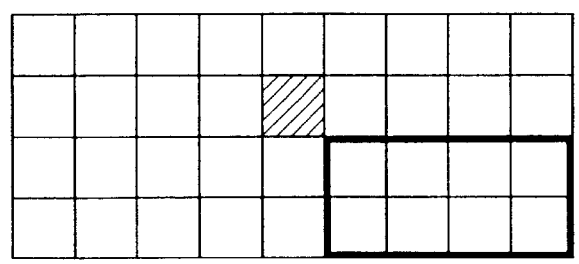

FIG. 4 is an illustration of this embodiment showing operation of the majority detection circuit 202.

The majority detection circuit 202 includes a memory 204 for storing the first judging results of the peripheral pixel comparing circuit 201 and reads and outputs the first judging result at a predetermined peripheral area including Q pixels as shown in FIG. 4, for example, eight pixels around the target pixel TP, and a majority detector 205. The majority detector 205 detects a majority of the Q results of the peripheral pixel comparing circuit 201 at Q pixels around the target pixel TP.

The majority detector 205 detects majority of eight first judging results and if more than R1 pixels show the same judging result, the majority detector 205 detects the majority as the second judging result to equalize the motion judgment at the target pixel TP to the judging results at adjacent pixels around the target pixel TP to avoid an isolated judging result. More specifically, if the motion at four pixels out of the eight adjacent pixels are judged to be moving and motion at another four adjacent pixels are judged to be intermediate motion, the second judging result is made to be the intermediate motion. If the motion at four adjacent pixels is judged to be intermediate motion and motion at another four pixels is judged to be stopping, the second judging result of the target pixel is judged as stopping to provide the second judging result which is weighted to the side of stopping. That is, the intermediate motion judged by the peripheral pixel comparing circuit 201 is judged again to stopping, so that noise at the image which is stopping is reduced.

FIGS. 5A to 5E and FIGS. 6A to 6E are illustrations of areas of pixels to be processed by the polarity deviation detection circuit 203. The upper left area UL shown in FIG. 5B, the upper right area UR shown in FIG. 5C, the lower left area LL shown in FIG. 5D, and the lower right area LR shown in FIG. 5E include the target pixel shown in FIG. 5A. On the other hand, the upper left area shown in FIG. 6B, the upper right area shown in FIG. 6C, the lower left area shown in FIG. 6D, and the lower right area shown in FIG. 6E outside the target pixel TP shown in FIG. 6A but adjacent to the target pixel TP.

The polarity deviation compensation circuit 206 includes a polarity deviation detection circuit 203 and an inverter 207, an AND gate 208, and an OR gate 209. In response to an intermediate motion Smi from the majority detection circuit 202, the polarity deviation detection circuit 203 detects polarities of the differential signal Sd at each pixel of the video signal, detects agreement of the polarities of all pixels at any of an upper left area UL of the target pixel, an upper right area UR of the target pixel, a lower left area LL of the target pixel, and a lower right area LR of the target pixel, and judges the motion in the interframe difference signal Sd at the target pixel TP as moving in the presence of the agreement.

When the majority detection circuit 202 judges motion at the target pixel TP as intermediate motion (Smi), the polarity deviation compensation circuit 206 compensates the second judging result of the majority detection circuit 202 from the intermediate motion (Smi) with the inverter 207 and the AND gate 208. On the other hand, the OR gate 209 does not compensate the second judging result of the majority detection circuit 202 in accordance with the result of the polarity deviation detection circuit 203.

More specifically, when the majority detection circuit 202 judges the motion as intermediate motion and the polarity deviation detection circuit judges the motion to be moving, the majority detection circuit outputs L logic level at a signal Sst, H logic level at a signal Smi (an output of the AND gate 208), and L logic level at a signal Smo (an output of the OR gate 209). In response to the signal Smi, the polarity deviation detection circuit 203 judges the motion and if the third judging result is stopping, the polarity deviation detection circuit 203 outputs H logic level. Then, the inverter 207 outputs L logic level, so that the H logic level at an output of the AND gate 208 is changed to L logic level. On the other hand, L logic level at an output of the OR gate 209 is unchanged.

If the third Judging result of the polarity deviation detection circuit 202 is not moving, the polarity deviation detection circuit 203 outputs L logic level, so that the AND gate 208 remains H logic level and the output of the OR gate 209 remains L logic level. As mentioned, the motion Judgement is effected again, so that a more accurate Judgement is provided.

Figure 7:
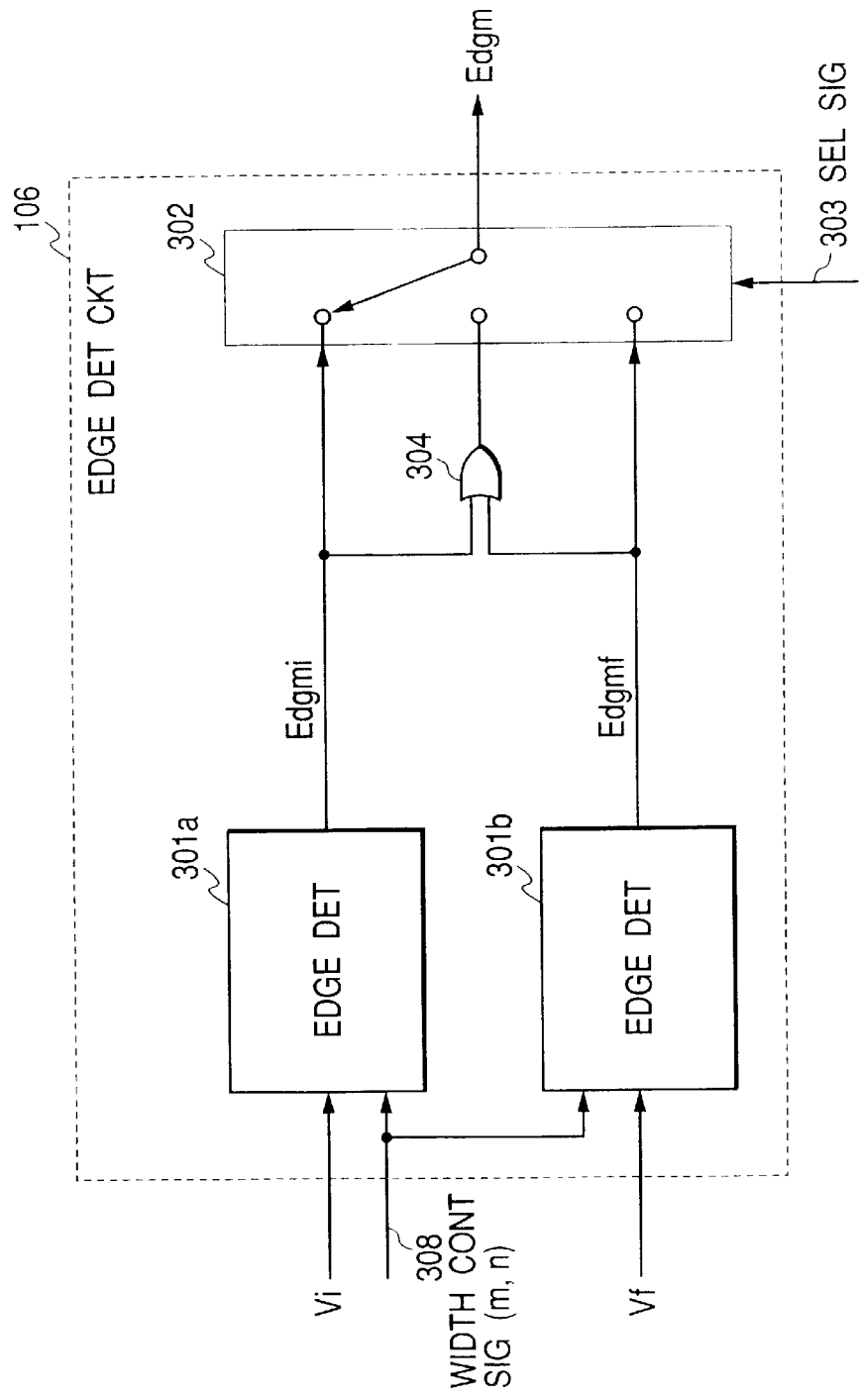
FIG. 7 is a block diagram of this embodiment showing the structure of the edge detection signal generation circuit shown in FIG. 1.
Figure 8:
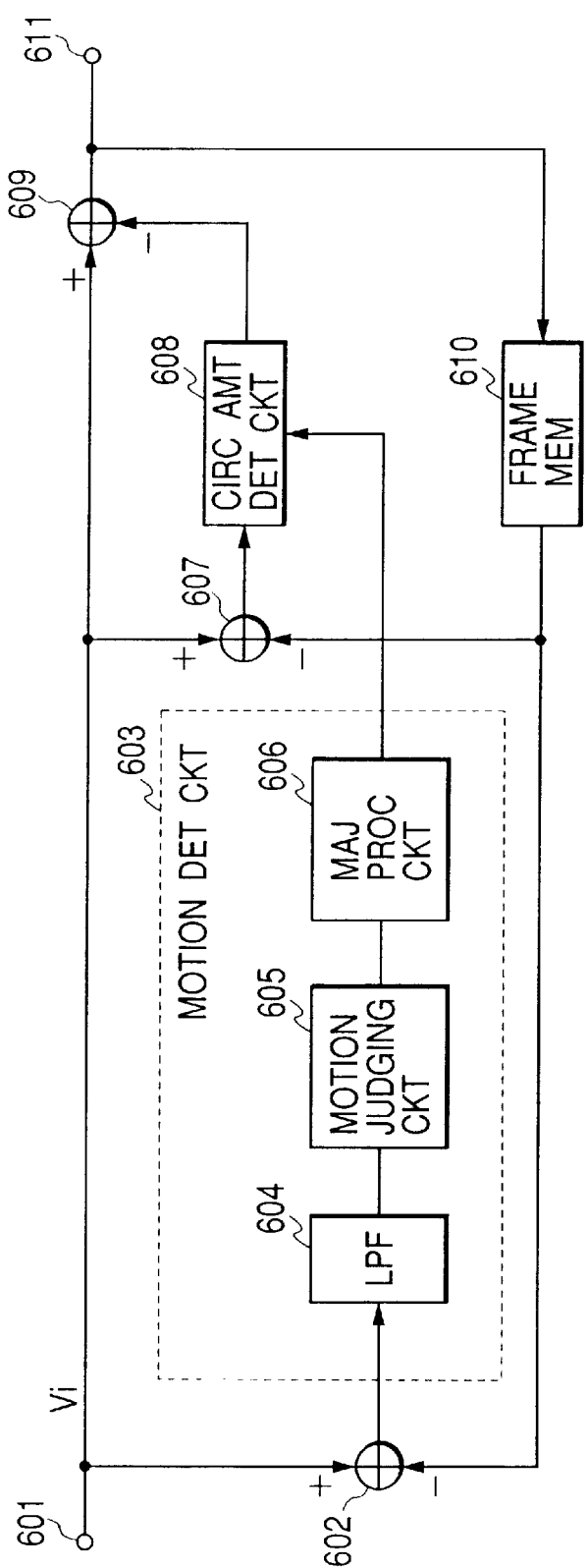
FIG. 8 is a block diagram of a prior art noise suppression circuit including a prior art motion detection circuit.

FIG. 7 is a block diagram of this embodiment showing the structure of the edge detection circuit 106 shown in FIG. 1.

The edge detection circuit 106 includes a first edge detection circuit 301a, a second edge detection circuit 301b, an OR gate 304, and an edge selection circuit 302. The first edge detection circuit 301a detects an edge from the video signal Vi with width of horizontally arranged (2m +1) pixels (the target pixel and m right pixels and m left pixels) and width of vertically arranged (2n+1) pixels (the target pixel and n upper pixels and n lower pixels) to generate the edge detection signal Edgmi. The second edge detection circuit 301b detects an edge from the video signal Vf with width of horizontally arranged (2m+1) pixels and width of vertically arranged (2n+1) pixels to generate the edge detection signal Edgmf.

The OR gate 304 generates an edge detection signal which is intermediate between the edge detection signals Edgmi and Edgmf. The edge selection circuit 302 outputs either the edge detection signal Edgmi, the edge detection signal Edgmf, or the output of the OR gate 304 as the edge detection signal Edgm in accordance with the selection signal 303.

The edge detection signal Edgm represents an edge with H logic level (1) and a flat portion with L logic level (0).

The polarity detection circuit 203 controls the size (M, N) of the upper left area UL, the upper right area UR, the lower left area LL, and the lower right area LR in accordance with the edge detection signal Edgm. More specifically, when the edge detection signal is H (1), the number of the pixels (M, N) at the area is reduced, for example 3×2 pixels and if the edge detection signal is L (0), the number of pixels (M×N) is made large, for example 5×2 pixels, so that generation of after image is suppressed and noise at stopping areas is reduced.

As mentioned, the motion detection is effected more accurately, so that after image by movement of image is suppressed and the noise at stopping portions are suppressed.

What is claimed is:

1. A motion detection circuit comprising:
   delay means for generating a delayed video signal from a video signal, said delayed video signal being delayed by one frame from said video signal;
   interframe difference signal generation means for generating an interframe difference signal between said video signal and said delayed video signal;
   edge detection signal generation means for detecting an edge from said video signal and said delayed video signal and generating an edge detection signal; and
   motion judging means for judging a motion in said video signal at a target pixel from said interframe difference signal in accordance with said edge detection signal to output a motion detection signal, wherein said motion judging means includes:
   peripheral pixel comparing means for detecting polarities of said interframe difference signal at each pixel at a predetermined area around said target pixel, detecting a difference in the number between said positive and negative polarities of said interframe difference signal at each pixel at said predetermined area and an absolute value of said difference, obtaining a J-valued first result from said absolute value to output said J-valued first result; and
   majority detection means including a memory for detecting a majority of Q of said first results of said peripheral pixel comparing means at Q pixels around said target pixels and judging said motion in said interframe difference signal at said target pixel in accordance with said detected majority with deviation to a side of stopping to output a second result as said motion detection signal, J being a natural number more than one, Q being a natural number more than one.

2. A motion detection circuit as claimed in claim 1, further comprising:
   a low-pass filter for low-pass-filtering said interframe difference signal; and
   a selector for supplying either of an output of said low-pass filter or said interframe difference signal to said motion judging means as said interframe difference signal in accordance with a selection signal.

3. A motion detection circuit as claimed in claim 1, wherein said motion judging means further includes polarity deviation detecting means for detecting polarities of said interframe difference signal at each pixel of said video signal, detecting agreement of said polarities of all pixels at any of an upper left area of said target pixel, an upper right area of said target pixel, a lower left area of said target pixel, and a lower right area of said target pixel, and judging motion in said interframe difference signal at said target pixel to be moving in the presence of said agreement, each of said upper left area, said upper right area, said lower left area, and said lower right area including M×N pixels of said video signal, M and N being natural numbers, wherein said polarity deviation detection means changes said second result from said intermediate movement to said moving in accordance with said agreement to output said motion detection signal when said second result is indicative of said intermediate motion and outputs said motion detection signal with said second result unchanged when said second result is indicative of said moving and stopping.

4. A motion detection circuit as claimed in claim 3, wherein said upper left area, said upper right area, said lower left area, and said lower right area include said target pixel.

5. A motion detection circuit as claimed in claim 3, wherein said upper left area, said upper right area, said lower left area, and said lower right area are outside and adjacent to said target pixel.

6. A motion detection circuit as claimed in claim 1, wherein said edge detection signal generation means comprises a first edge detection circuit for detecting an edge from said video signal, a second edge detection circuit for detecting an edge from said delayed video signal, a logic circuit for detecting an edge from said video signal and said delayed video signal, and a switch responsive to a selection signal for outputting either of an output of said first, second, or third edge detection circuit as said edge detection signal.

7. A motion detection circuit as claimed in claim 6, wherein said edge detection signal generation means is further responsive to a width control signal indicative of values of m and n and said edge detection signal generation means detects said edge detection signal with a horizontal width of (2m+1) pixels and with a vertical width of (2n+1) pixels, said n and m are positive integers.

8. A motion detection circuit as claimed in claim 3, wherein values of said M and N are controlled in accordance with said edge detection signal.

9. A noise suppression apparatus comprising:
    a motion detection means including:
        delay means for generating a delayed video signal from a video signal, said delayed video signal being delayed by one frame from said video signal;
        interframe difference signal generation means for generating an interframe difference signal between said video signal and said delayed video signal;
        a low-pass filter for low-pass-filtering said interframe difference signal;
        a switch for outputting either of an output of said low-pass filter or said interframe difference signal in accordance with a selection signal;
        edge detection signal generation means for detecting an edge from said video signal and said delayed video signal and generating an edge detection signal; and
        motion judging means for judging motion in a target pixel of said video signal from an output of said switch in accordance with said edge detection signal;
        circulation signal generation means for generating a circulation signal in accordance with said interframe difference signal and said judged motion; and
        difference signal generation means for generating a difference signal between said circulation signal and said video signal to output a noise suppressed video signal, wherein said motion judging means includes:
        peripheral pixel comparing means for detecting polarities of said interframe difference signal at each pixel at a predetermined area around said target pixel, detecting a difference in the number between said positive and negative polarities of said interframe difference signal at each pixel at said predetermined area and an absolute value of said difference, obtaining a J-valued first result from said absolute value, said polarity deviation detection means changing said first result to stopping in accordance with said agreement when said difference is judged to be an intermediate value among J values to output a second result; and
        majority detection means including a memory for detecting a majority of Q of said second results of said polarity deviation detection means at Q pixels around said target pixels and judging said motion in said interframe difference signal at said target pixel in accordance with said detected majority with deviation to a side of stopping to output said motion detection signal, J being a natural number more than one, Q being a natural number more than one.

10. A noise suppression apparatus as claimed in claim 9, wherein said coefficient k when said motion judging means judges said motion to be stopping is greater than said coefficient k when said motion judging means judges said motion to be moving.

11. A noise suppression apparatus as claimed in claim 9, wherein said motion judging means further includes polarity deviation detecting means for detecting polarities of said interframe difference signal at each pixel of said video signal, detecting agreement of said polarities of all pixels at any of an upper left area of said target pixel, an upper right area of said target pixel, a lower left area of said target pixel, and a lower right area of said target pixel, and judging motion in said interframe difference signal at said target pixel to be moving in the presence of said agreement, each of said upper left area, said upper right area, said lower left area, and said lower right area respectively including M×N pixels of said video signal, M and N being natural numbers, wherein said polarity deviation detection means changes said second result from said intermediate movement to said stopping in accordance with said agreement to output said motion detection signal when said second result is indicative of said intermediate motion and outputs said motion detection signal with said second result unchanged when said second result is indicative of said moving and stopping.

12. A noise suppression apparatus as claimed in claim 11, wherein said upper left area, said upper right area, said lower left area, and said lower right area include said target pixel.

13. A noise suppression apparatus as claimed in claim 11, wherein said upper left area, said upper right area, said lower left area, and said lower right area are outside and adjacent to said target pixel.

14. A noise suppression apparatus as claimed in claim 9, wherein said edge detection signal generation means comprises a first edge detection circuit for detecting an edge from said video signal, a second edge detection circuit for detecting an edge from said delayed video signal, a third edge detection circuit for detecting an edge from said video signal and said delayed video signal, and a switch responsive to a selection signal for outputting either of an output of said first, second, or third edge detection circuit as said edge detection signal.

15. A noise suppression apparatus as claimed in claim 14, wherein said edge detection signal generation means is further responsive to a width control signal indicative of values of m and n and said edge detection signal generation means detects said edge detection signal with a horizontal width of (2m+1) pixels and with a vertical width of (2n+1) pixels, said n and m are positive integers.

16. A noise suppression apparatus as claimed in claim 11, wherein values of said M and N are controlled in accordance with said edge detection signal.

17. A noise suppression apparatus as claimed in claim 9, wherein said circulation signal generation means includes:
    coefficient generation means for generating a coefficient k, $k \leq 0 < 1$ in accordance with a judging result of said motion judging means; and
    a multiplier for multiplying said video signal by said coefficient k to output a circulation signal.

* * * * *